(12) United States Patent
Yang et al.

(10) Patent No.: US 12,361,581 B2
(45) Date of Patent: Jul. 15, 2025

(54) 3-DIMENSION PARCEL MEASUREMENT DEVICE ACCORDING TO A CAPTURED IMAGE AND DEPTH MEASUREMENT

(71) Applicant: Nomura Research Institute, Ltd., Tokyo (JP)

(72) Inventors: Menglong Yang, Kanagawa (JP); Satomi Tanabe, Tokyo (JP); Satoshi Takahashi, Kanagawa (JP); Naoki Shimizu, Tokyo (JP)

(73) Assignee: Nomura Research Institute, Ltd., Tokyo (JP)

( * ) Notice: Subject to any disclaimer, the term of this patent is extended or adjusted under 35 U.S.C. 154(b) by 454 days.

(21) Appl. No.: 17/902,418

(22) Filed: Sep. 2, 2022

(65) Prior Publication Data
US 2023/0281854 A1  Sep. 7, 2023

(30) Foreign Application Priority Data

Mar. 4, 2022  (JP) .................................. 2022-033177

(51) Int. Cl.
*G06T 7/62*  (2017.01)
*G06T 7/521*  (2017.01)
(Continued)

(52) U.S. Cl.
CPC ................ *G06T 7/62* (2017.01); *G06T 7/521* (2017.01); *G06T 7/70* (2017.01); *G06V 10/25* (2022.01);
(Continued)

(58) Field of Classification Search
CPC .. G06T 7/62; G06T 7/521; G06T 7/70; G06T 11/60; G06T 2207/10028; G06T 7/60;
(Continued)

(56) References Cited

U.S. PATENT DOCUMENTS 9,460,524 B1 * 10/2016 Curlander .............. G06V 20/20
9,607,406 B2 * 3/2017 Hata ......................... G06T 7/75
(Continued)

FOREIGN PATENT DOCUMENTS

| CN | 110174056 A | 8/2019 |
|---|---|---|
| JP | 2018-112521 A | 7/2018 |

(Continued)

OTHER PUBLICATIONS

Peng et al, Portable System for Box Volume Measurement Based on Line-Structured Light Vision and Deep Learning, 2019, Sensors 19 3921: 1-23. (Year: 2019).*

(Continued)

*Primary Examiner* — Kathleen M Broughton
(74) *Attorney, Agent, or Firm* — RANKIN, HILL & CLARK LLP

(57) ABSTRACT

The shape of an object is measured with high accuracy. A measurement system includes a frame recognition unit configured to detect one or more frames indicating a straight line portion from a captured image, a depth measurement unit configured to perform depth measurement, and a dimension estimation unit configured to calculate a length of a frame on a basis of the captured image and a result of the depth measurement. The measurement system may have a function of specifying a range in which a measurement target object is present from the captured image.

6 Claims, 14 Drawing Sheets

(51) Int. Cl.
  *G06T 7/70* (2017.01)
  *G06V 10/25* (2022.01)
  *G06V 10/74* (2022.01)

(52) U.S. Cl.
  CPC ........ *G06V 10/761* (2022.01); *G06V 2201/07* (2022.01)

(58) Field of Classification Search
  CPC .. G06V 10/25; G06V 10/761; G06V 2201/07; G01B 11/002; G01B 11/022; G01B 11/03; G01B 11/254
  See application file for complete search history.

(56) References Cited

U.S. PATENT DOCUMENTS

| | | | |
|---|---|---|---|
| 2017/0264880 A1* | 9/2017 | Zolotov | G06F 18/24 |
| 2018/0165822 A1 | 6/2018 | Uliyar et al. | |
| 2018/0202797 A1 | 7/2018 | Kawashima et al. | |
| 2020/0167944 A1* | 5/2020 | Ono | G01B 11/022 |

FOREIGN PATENT DOCUMENTS

| | | |
|---|---|---|
| JP | 2019-211425 A | 12/2019 |
| WO | 2012/155104 A1 | 11/2012 |

OTHER PUBLICATIONS

Proenca et al, SPLODE: Semi-Probalistic Point and Line Odometry with Depth Estimation from RGB-D Camera Motion, 2017, arXiv: 1708.02837v1, 1-8. (Year: 2017).*

Xue et al., "Holistically-Attracted Wireframe Parsing", [online] https://arxiv.org/pdf/2003.01663v1.pdf, 2020, total 10 pages; Cited in Specification.

Lin et al., "Focal Loss for Dense Object Detection", [online] https://arxiv.org/pdf/1708.02002.pdf, 2018, total 10 pages; Cited in Specification.

Extended European Search Report (EESR) dated Jul. 25, 2023 and issued in European Patent Application No. 22194866.4.

Khaliluzzaman et al., "Geometrial Feature Based Stairways Detection and Recognition Using Depth Sensor", IECON 2018—44th Annual Conference of the IEEE Industrial Electronics Society, IEEE, Oct. 21, 2018, pp. 3250-3255; Cited in EESR.

* cited by examiner

130

140

174c

210

220

230

3-DIMENSION PARCEL MEASUREMENT DEVICE ACCORDING TO A CAPTURED IMAGE AND DEPTH MEASUREMENT

TECHNICAL FIELD

The present invention relates to a technique for measuring the size of an object.

BACKGROUND ART

As a method of measuring a package size in distribution, a method of passing through a gate incorporating an optical sensor is common, but this needs introduction of expensive dedicated equipment, and this is not suitable for measurement or the like at the time of delivery of package.

In Patent Literature 1, a package is imaged by a stereo camera from obliquely above to obtain two captured images. The stereo camera sends the two captured images to a server, and the server creates a depth map by the principle of triangulation. The server calculates the vertex coordinates of the package on the basis of the depth map to calculate the size of the package (see paragraphs [0014], [0015], [0022], [0023], and the like of Patent Literature 1).

CITATION LIST

Patent Literature

Patent Literature 1: JP 2019-211425 A
Patent Literature 2: JP 2018-112521 A
Patent Literature 3: JP 2021-107268 A

Non Patent Literature

Non Patent Literature 1: Nan Xuel, and 6 others, "Holistically-Attracted Wireframe Parsing", [online], Mar. 3, 2020, searched in the Internet on Jan. 25, 2022, <URL: arxiv.org/pdf/2003.01663v1.pdf>
Non Patent Literature 2: Tsung-Yi Lin, and 4 others, "Focal Loss for Dense Object Detection", [online], Feb. 7, 2018, searched in the Internet on Jan. 25, 2022, <URL: arxiv.org/pdf/1708.02002.pdf>

SUMMARY OF INVENTION

Technical Problem

In Patent Literature 1, since it is assumed that all the eight vertices are measured (see paragraph [0023]), it is considered that it is necessary to image the package from a plurality of directions. In addition, in Patent Literature 1, the target of measurement is limited to a package having a rectangular parallelepiped shape moving in a conveyance path.

The present invention focuses on the background of the era in which laser imaging detection and ranging (LiDAR) technology is being incorporated as standard in smartphones, and a main object thereof is to provide a technique for measuring the shape of an object in consideration of cost, accuracy, and operability.

Solution to Problem

A measurement system according to one aspect of the present invention includes a frame recognition unit configured to detect one or more frames indicating a straight line portion from a captured image, a depth measurement unit configured to perform depth measurement, and a dimension estimation unit configured to calculate a length of a frame on a basis of the captured image and a result of the depth measurement.

Advantageous Effects of Invention

According to the present invention, the shape of an object can be easily measured with high accuracy.

DESCRIPTION OF EMBODIMENTS

In the description below, first, as a first embodiment, a method of measuring dimensions of a package having a rectangular parallelepiped shape will be described. Next, as a second embodiment, a method for measuring dimensions of members in an indoor space will be described.

The first embodiment and the second embodiment are referred to as "the present embodiments" when these are referred to collectively or without distinction.

First Embodiment

Figure 1:
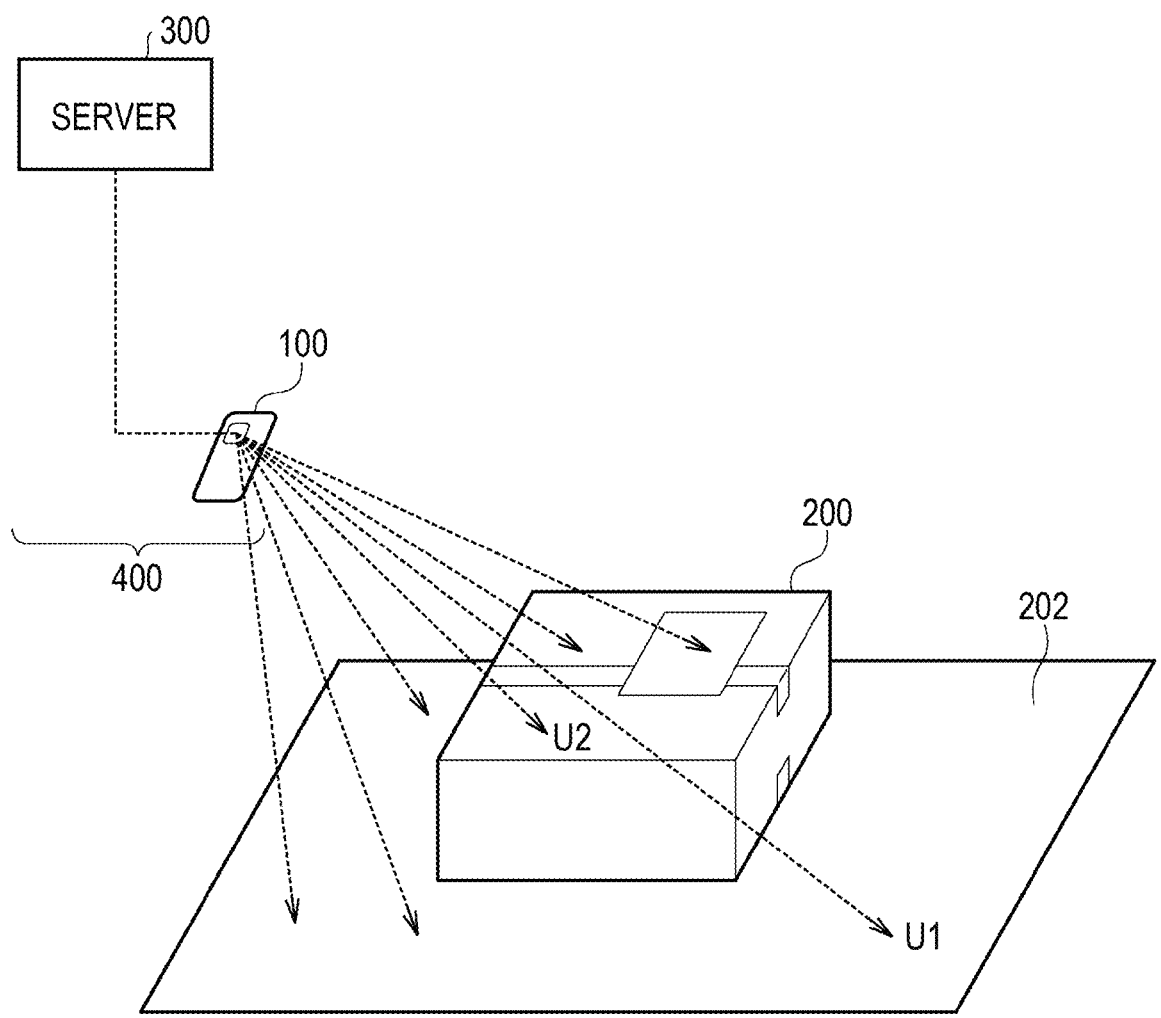
FIG. 1 is a schematic diagram for describing a method of measuring the shape of a package.

FIG. 1 is a schematic diagram for describing a method of measuring the shape of a package 200.

A measurement device 100 in the present embodiment is a smartphone equipped with LiDAR.

The measurement device 100 may be a device dedicated to measurement. The LiDAR measures the distance from an irradiation point to a reflection point (arrival point of laser light) on the basis of a time from irradiation of the laser light to detection of a reflected wave thereof. Hereinafter, the distance from the irradiation point to the reflection point will be referred to as "distance depth". In addition, the height difference between the irradiation point and the reflection point based on the distance depth will be referred to as "height difference depth".

First, the user places the package 200 (measurement target object) on a floor surface 202 serving as a placement surface. The package 200 is an object having a rectangular parallelepiped shape such as a cardboard box. The rectangular parallelepiped shape mentioned herein also includes a "cube". Since there is usually slight distortion on the upper surface and the lower surface of the package 200, the "rectangular parallelepiped shape" used herein does not mean only a strict rectangular parallelepiped shape.

The user holds the measurement device 100 obliquely above the package 200 and touches an unillustrated measurement button displayed on the screen of the measurement device 100. When the measurement button is touched, the measurement device 100 irradiates a large number of points within a predetermined range including the package 200 and the floor surface 202 with laser light, and measures the distance depth of each point. For example, when a point U1 (floor surface 202) in FIG. 1 is irradiated with the laser light, the time until the reflected wave is detected becomes longer than when a point U2 (upper surface of the package 200) is irradiated with the laser light. Therefore, it can be seen that the point U1 is farther than the point U2, in other words, "the distance depth is larger". Since the laser light of LiDAR is coherent light narrowed in a narrow range, it is possible to measure the depth with high accuracy.

The measurement device 100 according to the present embodiment images the package 200 with a camera in addition to the depth measurement with laser light. On the basis of the depth map obtained by the depth measurement by the measurement device 100 and the captured image obtained by the camera, the measurement device 100 measures the length of each of the three sides (longitudinal side, lateral side, and height side) of the package 200 (hereinafter also referred to as "three-side measurement").

The measurement device 100 is wirelessly connected to a server 300 via the Internet. The measurement device 100 and the server 300 constitute a measurement system 400.

To be noted, in the following description, a horizontal plane direction is set as an XY plane, and a Z axis is set in a height direction as illustrated in FIG. 1. Coordinate values of each point on the horizontal plane are referred to as "XY coordinates", a coordinate value indicating the height of each point from the floor surface 202 is referred to as a "Z coordinate", and XYZ coordinates of each point are referred to as "three-dimensional coordinates".

Figure 2:
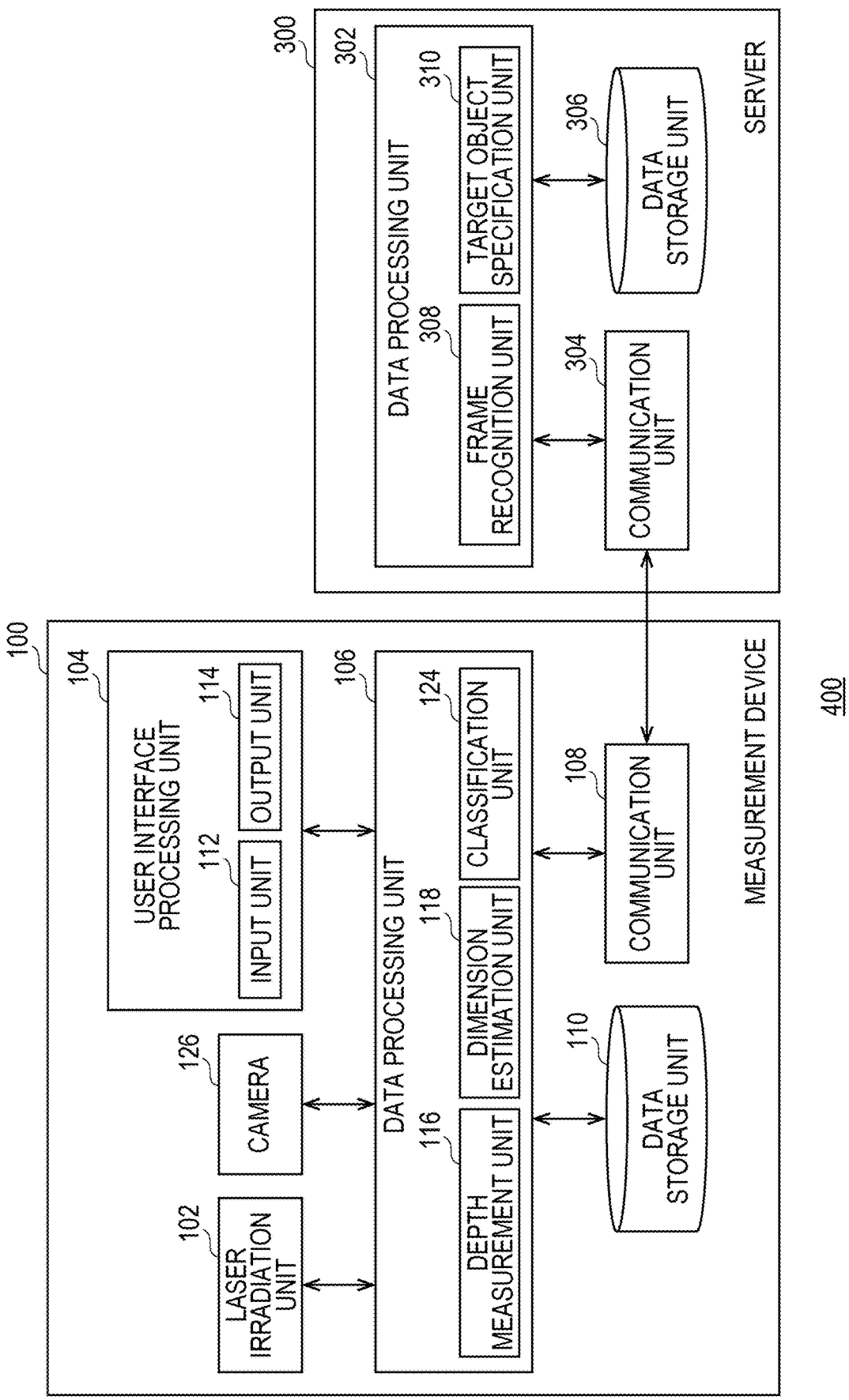
FIG. 2 is a functional block diagram of a measurement system.

FIG. 2 is a functional block diagram of the measurement system 400.

Each component of the measurement device 100 and the server 300 of the measurement system 400 is realized by hardware including an arithmetic unit such as a central processing unit (CPU) and various coprocessors, a storage device such as a memory and a storage, and a wired or wireless communication line connecting these, and software that is stored in the storage device and supplies processing instructions to the arithmetic unit. A computer program may be constituted by a device driver, an operating system, various application programs located in an upper layer thereof, and a library that provides a common function to these programs. Each block described below indicates not a configuration in a hardware unit but a block in a functional unit.

(Measurement Device 100)

The measurement device 100 includes a laser irradiation unit 102, a camera 126, a user interface processing unit 104, a data processing unit 106, a communication unit 108, and a data storage unit 110.

When a measurement instruction is given by touching a measurement button, the laser irradiation unit 102 continuously radiates laser light in multiple directions and detects a reflected wave. The user interface processing unit 104 receives an operation from a user, and is in charge of processing related to a user interface such as image display and sound output. The communication unit 108 is in charge of communication processing with the server 300 via the Internet. The data storage unit 110 stores various kinds of data. The data processing unit 106 executes various kinds of processing on the basis of data acquired by the laser irradiation unit 102, the camera 126, the user interface processing unit 104, and the communication unit 108 and data stored in the data storage unit 110. The data processing unit 106 also functions as an interface of the laser irradiation unit 102, the camera 126, the user interface processing unit 104, the communication unit 108, and the data storage unit 110.

The user interface processing unit 104 includes an input unit 112 that receives an input from a user, and an output unit 114 that outputs various kinds of information such as images and sound to the user.

The data processing unit 106 includes a depth measurement unit 116, a dimension estimation unit 118, and a classification unit 124.

The depth measurement unit 116 measures the distance depth of each point on the basis of a difference between the irradiation time of the laser light and the detection time of the reflected wave, and generates a depth map (described later). The dimension estimation unit 118 calculates dimensions of a measurement target object such as the package 200 on the basis of the captured image and the depth map. The classification unit 124 sums up the lengths of the three sides (longitudinal side, lateral side, and height side) of the package 200, and determines which of a plurality of size ranges the package 200 corresponds to, on the basis of a size classification table (not illustrated) registered in the data storage unit 110. In addition, the data storage unit 110 may store a fee table that associates the size range with the shipping fee. At this time, the classification unit 124 may further specify the shipping fee of the package 200 on the basis of the fee table.

(Server 300)

The server 300 includes a data processing unit 302, a communication unit 304, and a data storage unit 306.

The communication unit 304 is in charge of communication processing with the measurement device 100. The data storage unit 306 stores various kinds of data. The data processing unit 302 performs various processing on the basis of the data acquired by the communication unit 304 and the data stored in the data storage unit 306. The data processing unit 302 also functions as an interface of the communication unit 304 and the data storage unit 306.

The data processing unit 302 includes a frame recognition unit 308 and a target object specification unit 310.

The frame recognition unit 308 detects a "frame" described below from the captured image. The target object specification unit 310 detects a region where the measurement target object exists from the captured image (described later).

Figure 3:
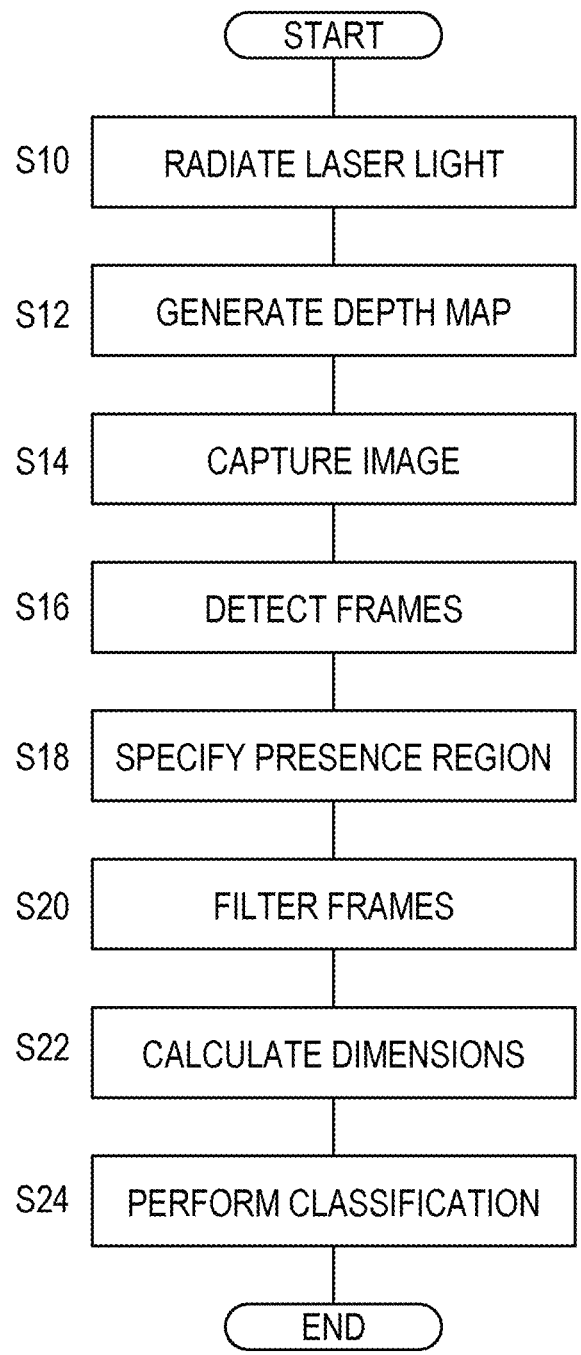
FIG. 3 is a flowchart illustrating a processing process of three-side measurement of a package.

FIG. 3 is a flowchart illustrating a processing process of three-side measurement of the package 200.

When the user holds the measurement device 100 over the package 200 and touches the measurement button, the following processing is started.

Specifically, the output unit 114 first displays a measurement button on the screen of the measurement device 100. The input unit 112 detects a touch on the measurement button. The measurement device 100 automatically executes three-side measurement of the package 200 only by touching the measurement button. Here, only an outline will be described, and details of each processing illustrated in FIG. 3 will be described later with reference to FIG. 4 and subsequent drawings.

When the user touches the measurement button, the laser irradiation unit 102 irradiates a plurality of points with laser light (S10). The depth measurement unit 116 generates a depth map (described later with reference to FIG. 4) indicating the distance depth of each of the plurality of points (S12).

Subsequently, the package 200 is imaged from above by the camera 126, and a captured image is acquired (S14). The communication unit 108 transmits the captured image to the server 300, and the frame recognition unit 308 of the server 300 detects a frame from the captured image (S16). A frame is a line segment element included in the captured image, and details thereof will be described later with reference to FIG. 6. The target object specification unit 310 of the server 300 specifies the presence region of the package 200 serving as a measurement target object from the captured image (S18). The presence region is a region indicating a range including the package 200 in the captured image (described later). The communication unit 304 transmits the captured image (hereinafter referred to as a "first frame image") including the frame and the presence region to the measurement device 100.

The dimension estimation unit 118 selects a frame necessary for three-side measurement from a large number of frames included in the first frame image (S20). This will be referred to as "frame filtering". After the frame filtering, the dimension estimation unit 118 calculates the lengths of the three sides (longitudinal side, lateral side, and height side) of the package 200 (S22). The classification unit 124 classifies the package 200 on the basis of the lengths of the three sides (S24).

Figure 4:
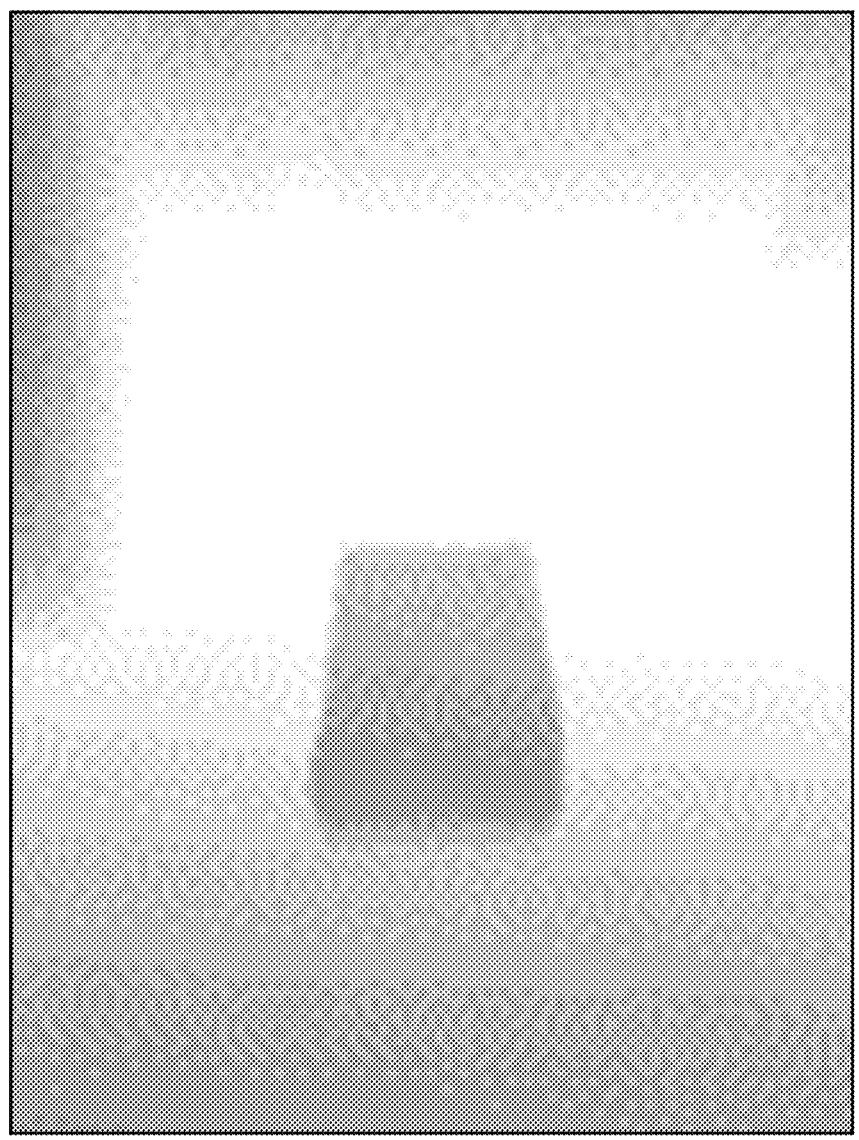
FIG. 4 is a screen view of a depth map according to a first embodiment.

FIG. 4 is a screen view of the depth map 130 according to the first embodiment.

FIG. 4 corresponds to the processing of S10 and S12 in FIG. 3. The laser irradiation unit 102 radiates laser light, and the depth measurement unit 116 measures the distance depth of each point, that is, the distance from the irradiation point of the measurement device 100 to the reflection point of the laser light. The depth measurement unit 116 generates the depth map 130 as an image that is darker at a position where the distance depth is smaller, and is brighter at a position where the distance depth is larger.

Since the measurement device 100 is positioned above the package 200 at the time of laser irradiation, a portion corresponding to the upper surface of the package 200 is displayed dark, and a portion corresponding to the floor surface 202 (non-package region) is displayed bright. Therefore, the depth map 130 is a relatively simple image close to a binary image.

Figure 5:
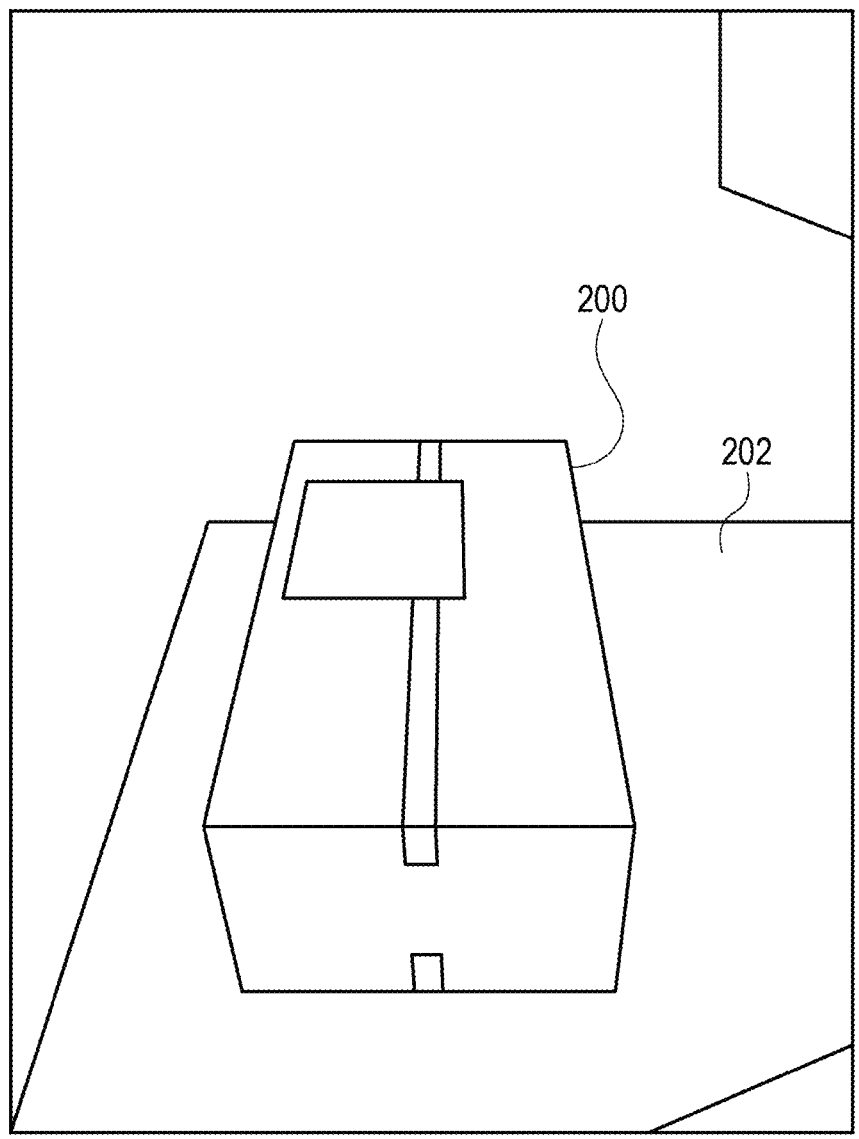
FIG. 5 is a screen view of a captured image according to the first embodiment.

FIG. 5 is a screen view of a captured image 140 according to the first embodiment.

Subsequently, the package 200 is imaged by the camera 126. Imaging of the package 200 is executed subsequently to completion of depth measurement by LiDAR. The captured image 140 is an RGB image including the package 200 and the floor surface 202. FIG. 5 corresponds to the processing of S14 in FIG. 3. The communication unit 108 transmits the depth map 130 and the captured image 140 to the server 300.

Figure 6:
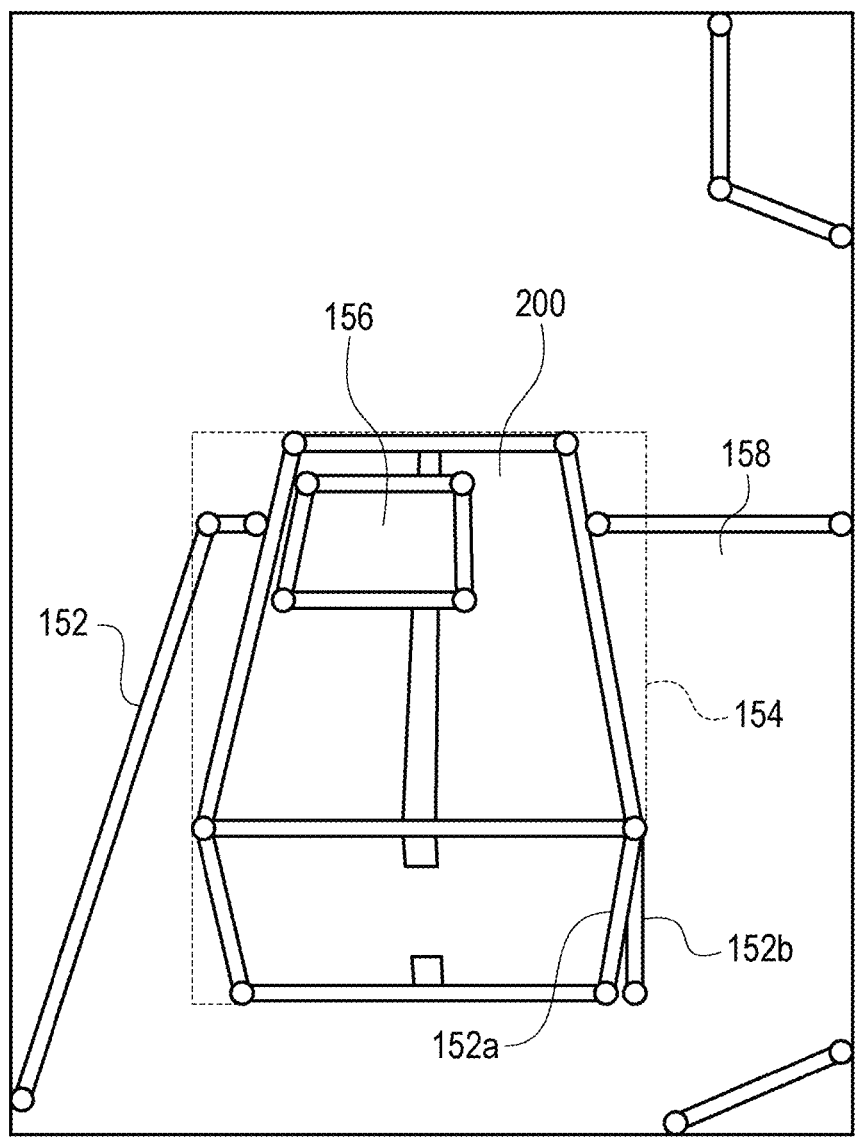
FIG. 6 is a screen view of a first frame image.

FIG. 6 is a screen view of a first frame image 150.

The frame recognition unit 308 detects line segment elements included in the captured image 140 as original frames 152. This processing corresponds to the processing of S16 in FIG. 3. Detection of the original frames 152 from the captured image 140 can be realized by application of a known technique (see, for example, Non Patent Literature 1). As illustrated in FIG. 6, the frame recognition unit 308 detects the original frames 152 not only from a straight portion of the package 200 but also from an end portion of a slip 156, an end portion of a carpet 158, and the like. As described above, the frame recognition unit 308 detects not only the package 200 but also various line segment elements included in the captured image 140 as the original frames 152.

The frame recognition unit 308 cannot always detect the original frames 152 reliably and appropriately. For example, depending on the image accuracy of the captured image 140, two similar original frames 152*a* and 152*b* may be detected as seen in the lower right of the package 200 although these are originally a single line segment element. A coping method in a case where a plurality of original frames 152 are detected from one line segment element will be described later with reference to FIG. 8.

The target object specification unit 310 specifies a presence region 154 corresponding to the package 200 in the captured image 140. This processing corresponds to the processing of S18 in FIG. 3. A method for specifying the presence region 154 can also be realized by application of a known technique (see, for example, Non Patent Literature 2). By performing machine learning of an image of a cardboard box to undergo in advance, the target object specification unit 310 can specify a region corresponding to the package 200 shown in the captured image 140 as the presence region 154.

Figure 7:
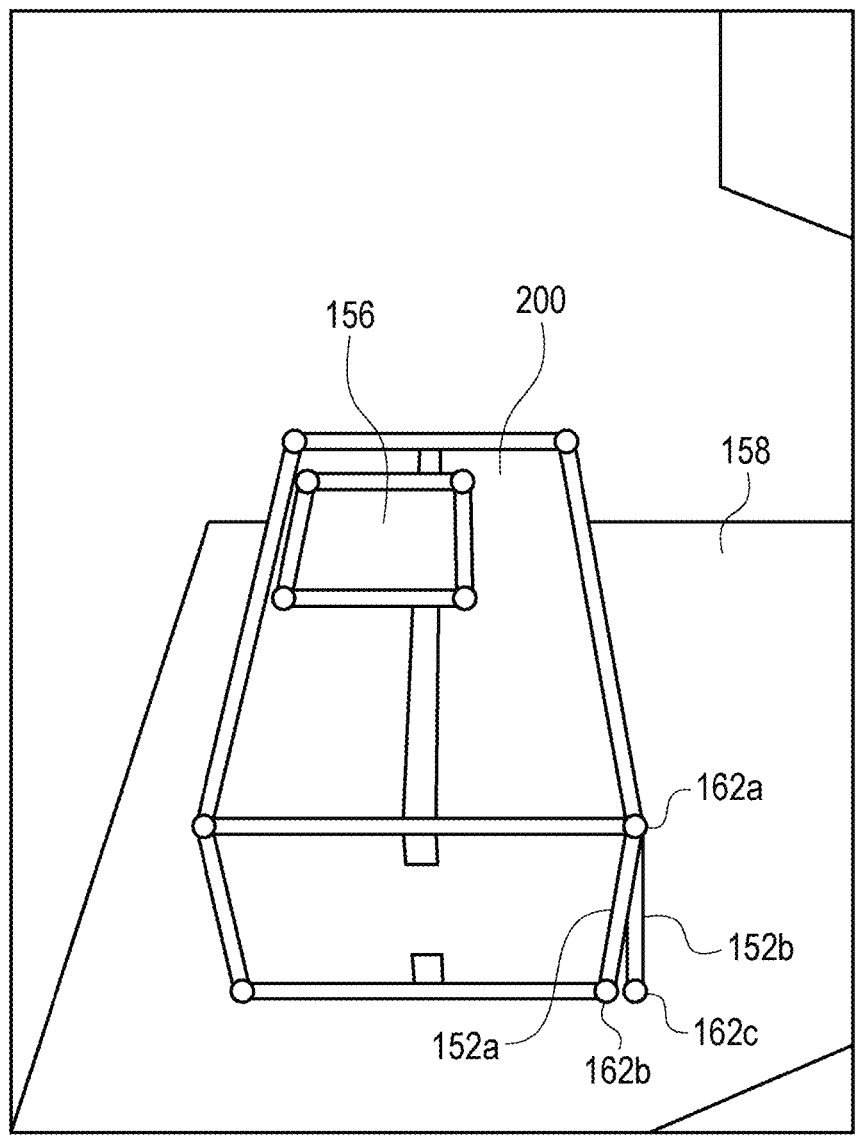
FIG. 7 is a screen view of a second frame image.

FIG. 7 is a screen view of a second frame image 160.

After the target object specification unit 310 specifies the presence region 154, the communication unit 304 transmits the first frame image 150 to the measurement device 100. The dimension estimation unit 118 of the measurement device 100 performs the frame filtering on the first frame image 150. The frame filtering shown in S20 in FIG. 3 includes four stages of processing including a first stage, a second stage, a third stage, and a fourth stage. The second frame image 160 is an image after the first-stage frame filtering is performed on the first frame image 150.

As the first-stage frame filtering, the dimension estimation unit 118 excludes original frames 152 that do not fall within the presence region 154 from the original frames 152 detected by the frame recognition unit 308. As illustrated in the second frame image 160 of FIG. 7, the original frames 152 other than the package 200, for example, the original frames 152 indicating the outer edge of the carpet 158, and the like are excluded from the first frame image 150 by the first-stage frame filtering. Meanwhile, the original frames 152 such as the outer edge of the slip 156 that are not necessary for three-side measurement of the package 200 remain.

As described above, the two original frames 152*a* and 152*b* are detected at the lower right of the package 200, and these original frames 152 share a vertex 162*a*. End points of the original frame 152*a* are vertices 162*a* and 162*b*, and end points of the original frame 152*b* are vertices 162*a* and 162*c*. In the second-stage frame filtering, such a plurality of original frames 152 that can be regarded as substantially one are unified.

Figure 8:
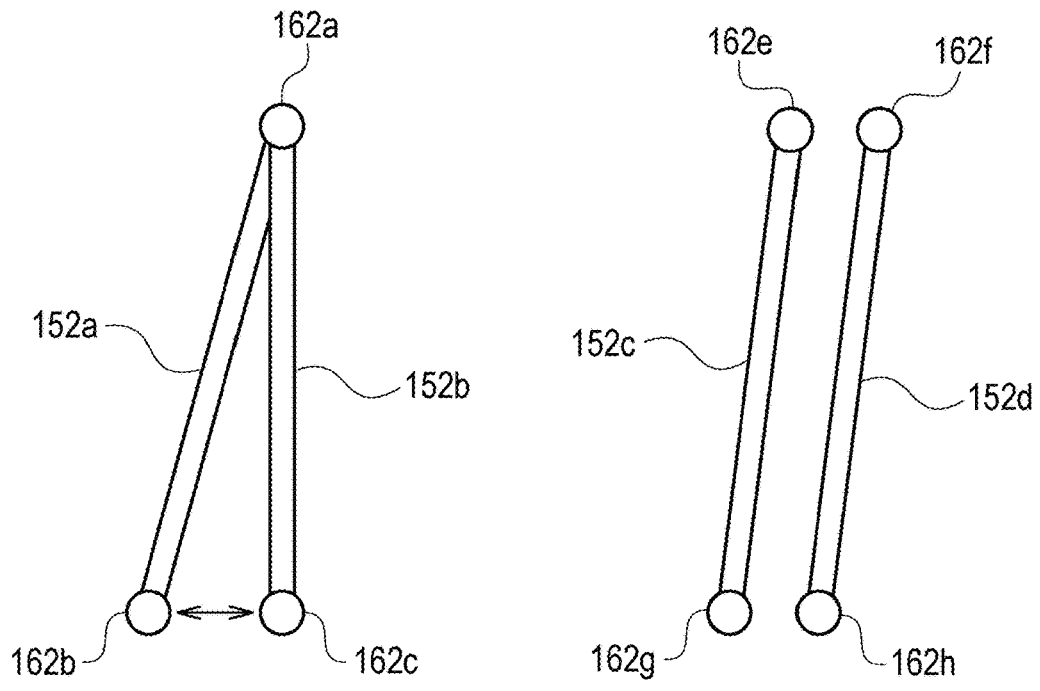
FIG. 8 is a schematic diagram for describing a processing method for second-stage frame filtering.

FIG. 8 is a schematic diagram for describing a processing method for second-stage frame filtering.

When a predetermined proximity condition is satisfied for four end points of the two original frames 152, the dimension estimation unit 118 unifies the two original frames 152 into one original frame 152. As an example, one end point of the original frame 152a and one end point of the original frame 152b illustrated in FIG. 7 are common as the vertex 162a (referred to as a "first condition"). Further, a distance between the vertex 162b which is the other end point of original frame 152a and a vertex 162c which is the other end point of original frame 152b is sufficiently short (referred to as a "second condition"). When the first condition and the second condition are satisfied, the dimension estimation unit 118 determines that the proximity condition is satisfied between the original frame 152a and the original frame 152b. In the present embodiment, the second condition is satisfied when the distance between the vertex 162b and the vertex 162c is equal to or less than a predetermined threshold, for example, equal to or less than 1/10 of the length of the original frame 152a or the length of the original frame 152b.

When the proximity condition is satisfied, the dimension estimation unit 118 deletes the original frame 152a or the original frame 152b from the second frame image 160, and thus unifies (combines) the two original frames 152a and 152b into one original frame 152. In addition, dimension estimation unit 118 may unify two original frames 152 into one original frame 152 by generating a new original frame 152 connecting the vertex 162a and a midpoint between the vertex 162b and vertex 162c.

As another example, the first condition may be satisfied when the distance between a vertex 162e that is one end point of an original frame 152c and a vertex 162f that is one end point of an original frame 152d is sufficiently short. Similarly, the second condition may be satisfied when the distance between a vertex 162g that is the other end point of the original frame 152c and a vertex 162h that is the other end point of an original frame 152d is sufficiently short. For example, the first condition may be satisfied when the distance between the vertex 162e and the vertex 162c is 1/10 of the length of the original frame 152c or the original frame 152d. When the first condition and the second condition are satisfied, the dimension estimation unit 118 determines that the proximity condition is satisfied between the original frame 152c and the original frame 152d, and combines the original frame 152c and the original frame 152d into one original frame 152.

By combining the two adjacent original frames 152 detected by the frame recognition unit 308 into one original frame 152, the original frames 152 to be processed thereafter can be rationally reduced.

Figure 9:
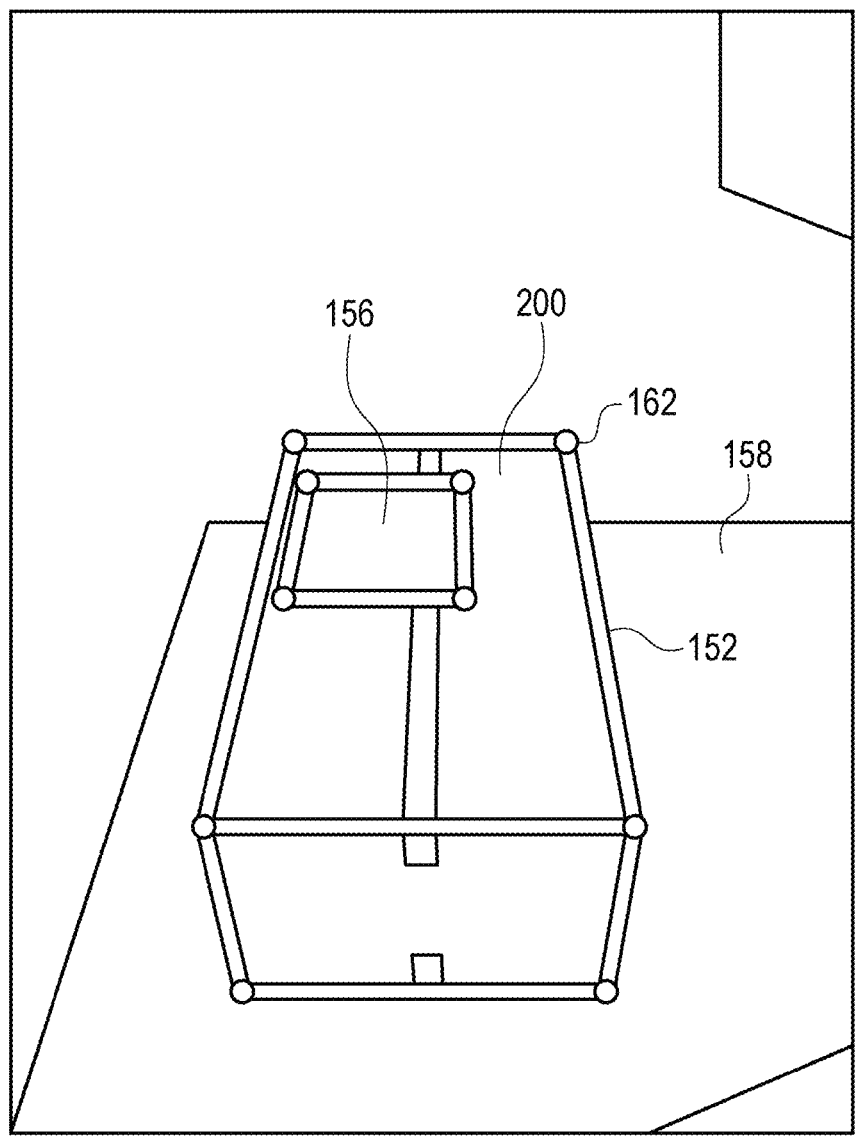
FIG. 9 is a screen view of a third frame image.

FIG. 9 is a screen view of a third frame image 170.

As a result of the second-stage frame filtering, a plurality of original frames 152 in which the proximity condition is satisfied are neatly collected into one original frame 152. The third frame image 170 is an image after the second-stage frame filtering is performed on the second frame image 160. In the third frame image 170, 11 original frames 152 and 10 vertices 162 remain.

Figure 10:
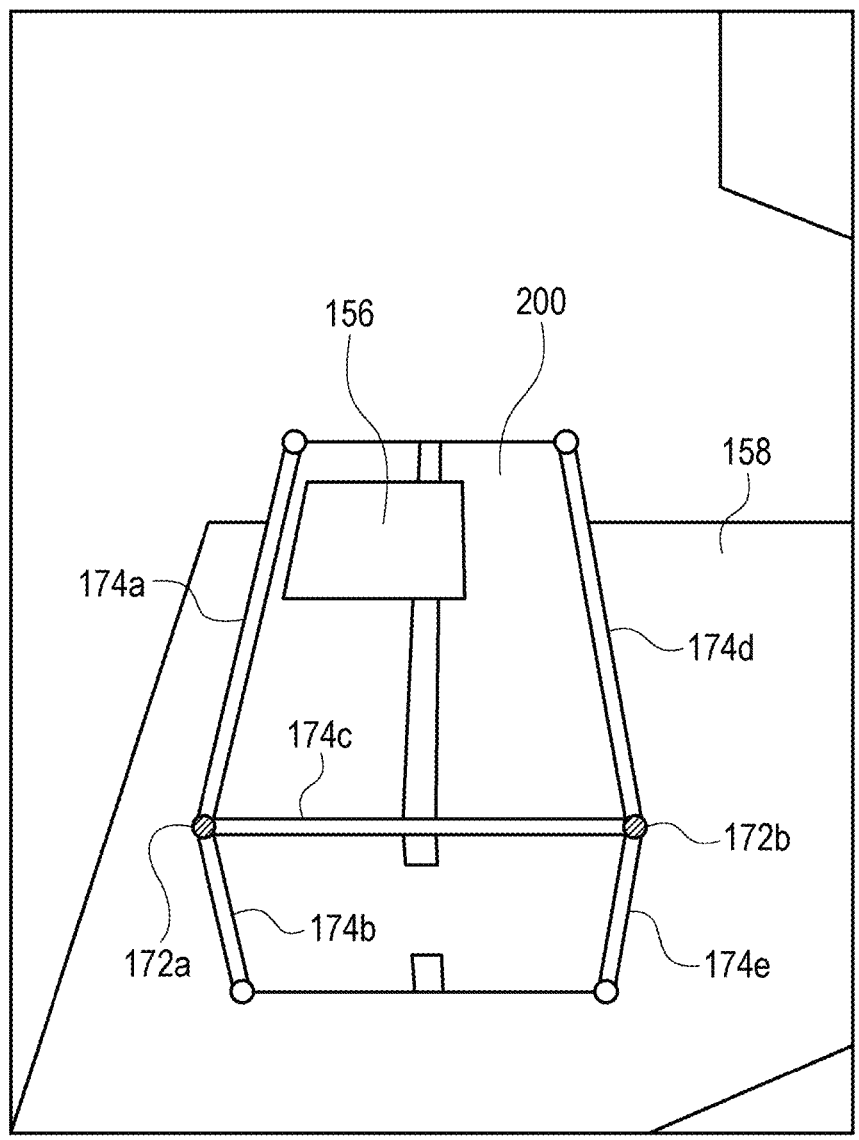
FIG. 10 is a screen view of a fourth frame image.

FIG. 10 is a screen view of a fourth frame image 180.

In the third-stage frame filtering, the dimension estimation unit 118 searches for a vertex 162 that is an intersection of three original frames 152 (hereinafter, such a point will be referred to as a "triple intersection"). Two triple intersections 172a and 172b are detected from the remaining 10 vertices 162 remaining in the third frame image 170 (see FIG. 9).

Hereinafter, among the original frames 152, the original frames 152 connected to triple intersections 172 will be referred to as "candidate frames 174". The candidate frames 174 connected to the triple intersection 172a are candidate frames 174a, 174b, and 174c. Meanwhile, candidate frames 174 connected to the triple intersection 172b are candidate frames 174c, 174d, and 174e.

As the third-stage frame filtering, the dimension estimation unit 118 excludes the original frames 152 indicating the outer edge of the slip 156 and the like from the target of the three-side measurement by keeping only the original frames 152 connected to the triple intersections 172 as the candidate frames 174. The fourth frame image 180 is an image after the third-stage frame filtering is performed on the third frame image 170.

When there is only one triple intersection 172 detected by the third-stage frame filtering, the fourth-stage frame filtering is not executed. When two or more triple intersections 172 are detected, the dimension estimation unit 118 executes the fourth-stage frame filtering. In FIG. 10, since two triple intersection 172a and 172b are detected, the fourth-stage frame filtering is executed.

Figure 11:
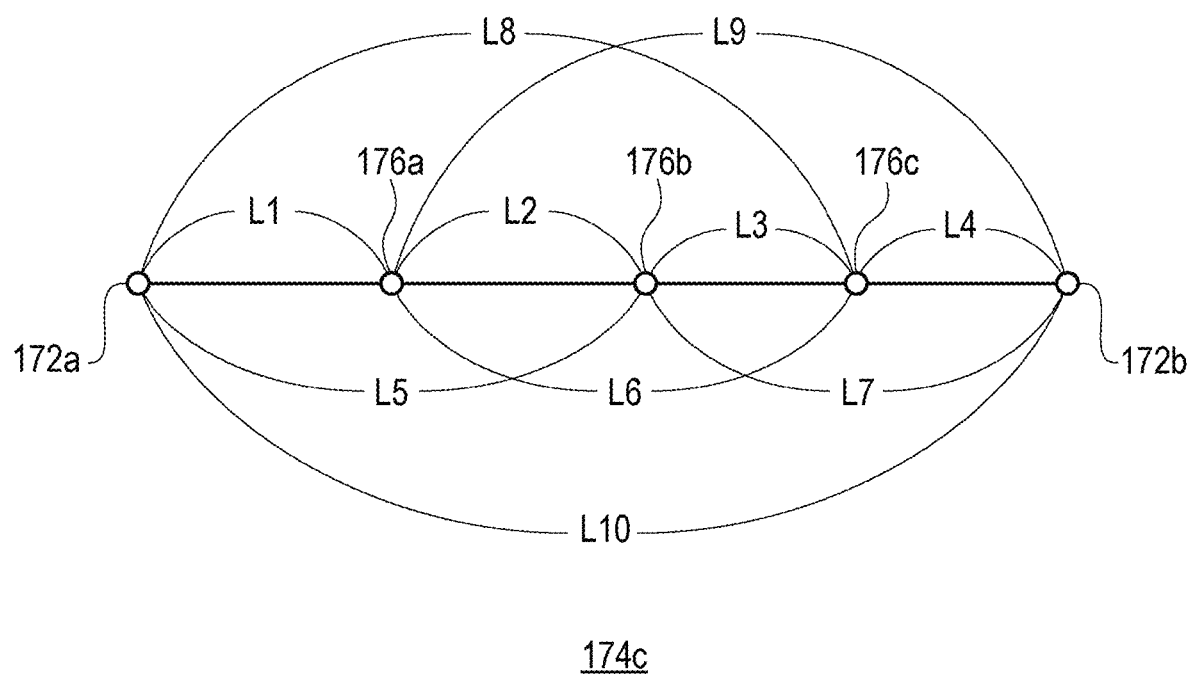
FIG. 11 is a schematic diagram for describing a calculation method for the length of a candidate frame.

FIG. 11 is a schematic diagram for describing a calculation method for the length of the candidate frames 174.

Before describing the fourth-stage frame filtering, a method for calculating the length of the frame will be described. Here, a candidate frame 174c having the triple intersection 172a and the triple intersection 172b as end points thereof will be described as a target, but the same applies to the other candidate frames 174.

First, the dimension estimation unit 118 equally divides the candidate frame 174c connecting the triple intersection 172a and 172b into a plural number. Here, it is assumed that the candidate frame 174c is divided into four. That is, the candidate frame 174c is divided into four by the triple intersection 172a, a division point 176a, a division point 176b, a division point 176c, and the triple intersection 172b. Hereinafter, these five points will be collectively referred to as "measurement points". Although it depends on the length of the candidate frame 174, usually several tens to several hundreds of measurement points are set in one candidate frame 174.

The dimension estimation unit 118 obtains three-dimensional coordinates (x coordinate, y coordinate, and z coordinate) at each measurement point. The dimension estimation unit 118 obtains the three-dimensional coordinates of each point appearing in the captured image 140 on the basis of the depth map 130 and the captured image 140. A technique of creating a point cloud data image from the depth map 130 and the captured image 140 and obtaining three-dimensional coordinates of each point is a well-known technique, and is also installed in some smartphones.

The length of the candidate frame 174c can be obtained by calculating the distance between the triple intersection 172a and 172b which are end points thereof. Hereinafter, the length of the candidate frame 174 will be referred to as a "frame length". However, since noise easily enters the depth map 130 based on the depth measurement, there is a possibility that the three-dimensional coordinates of each of the triple intersections 172a and 172b cannot be accurately obtained. Therefore, in the present embodiment, the dimension estimation unit 118 calculates the distance between measurement points (hereinafter referred to as an "inter-point distance") for all the measurement points, and regards the maximum inter-point distance as the frame length. Hereinafter, the frame length calculated in this manner will be referred to as "estimated frame length", and the actual frame length will be referred to as "measured frame length".

First, the dimension estimation unit 118 calculates an inter-point distance L1 between the triple intersection 172a (measurement point) and the division point 176*a* (measurement point). Specifically, the dimension estimation unit 118 calculates the inter-point distance L1 on the basis of the three-dimensional coordinates of the triple intersection 172*a* and the three-dimensional coordinates of the division point 176*a*. Subsequently, the dimension estimation unit 118 calculates an inter-point distance L2 between the division point 176*a* and the division point 176*b*. Similarly, the dimension estimation unit 118 calculates inter-point distances L3 to L10. As described above, the dimension estimation unit 118 sets the maximum inter-point distance among these 10 inter-point distances L1 to L10 as the estimated frame length. By setting many measurement points, even if a large error occurs in the coordinate values of some measurement points, it is possible to suppress the deviation between the measured frame length and the estimated frame length.

For example, there is a possibility that the inter-point distance L10 becomes an excessively small value as a result of addition of a large noise to the measurement value of the three-dimensional coordinates for the triple intersection 172*a*. In this case, for example, when the inter-point distance L9>L10 holds, the dimension estimation unit 118 may regard the inter-point distance L9 as the estimated frame length. Although the inter-point distance L9 is not the same as the measured frame length, it is possible to suppress the deviation from the measured value as compared with the case where the inter-point distance L10 is regarded as the estimated frame length. In addition, by setting a large number of measurement points, it is easier to further suppress the deviation between the measured value and the estimated value caused by the influence of noise.

Figure 12:
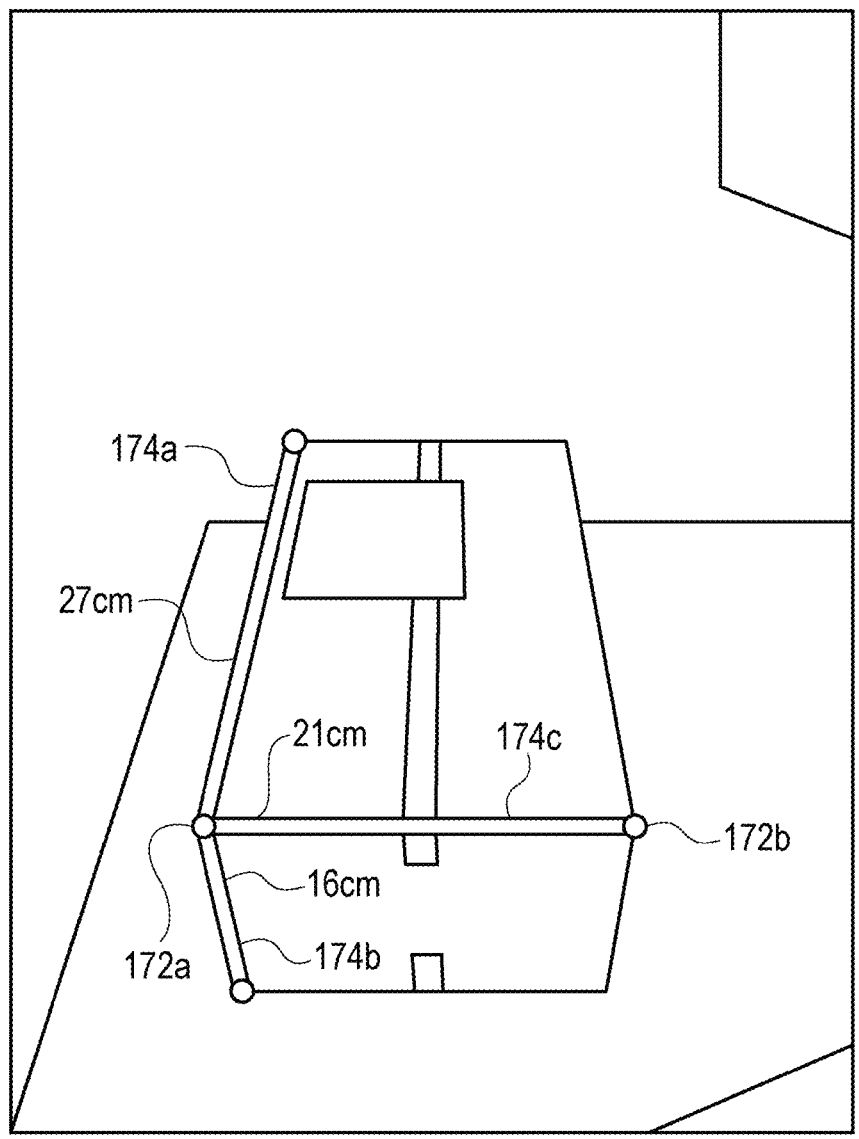
FIG. 12 is a screen view of a fifth frame image.

FIG. 12 is a screen view of a fifth frame image 190.

The fifth frame image 190 is an image after the fourth-stage frame filtering is performed on the fourth frame image 180. In the fourth-stage frame filtering, the dimension estimation unit 118 selects one triple intersection 172 from the plurality of triple intersections 172. In other words, in the fourth stage, the dimension estimation unit 118 selects three candidate frames 174.

First, the dimension estimation unit 118 calculates the estimated frame length of each of the three candidate frames 174*a*, 174*b*, and 174*c* connected to the triple intersection 172*a*, and obtains a sum thereof (hereinafter referred to as "total length"). Next, the dimension estimation unit 118 calculates the total length of three candidate frames 174*c*, 174*d*, and 174*e* connected to the triple intersection 172*b*. The dimension estimation unit 118 keeps a triple intersection 172 (longest triple intersection) having the largest total length among the plurality of triple intersections 172. In FIG. 12, the triple intersection 172*a* is selected.

The output unit 114 of the measurement device 100 displays the fifth frame image 190 on the screen. At this time, as illustrated in FIG. 12, the output unit 114 displays, on the screen, the lengths of the candidate frames 174*a*, 174*b*, and 174*c* that are finally remaining. In this manner, the user can perform the three-side measurement of the package 200 only by just imaging the package 200 with the measurement device 100. The dimension estimation unit 118 may calculate the volume of the package 200 on the basis of the result of the three-side measurement.

Second Embodiment

In the second embodiment, a method for measuring dimensions of each part in an indoor space will be described. Hereinafter, the dimension measurement in the second embodiment will be referred to as "environment measurement". By the measurement system 400, the user can easily measure dimensions of various objects captured in an image as scenery. The processing process of the dimension measurement in the second embodiment is similar to the processing process illustrated in the flowchart of FIG. 3, but the identification of the presence region 154 in S18 is not executed. When executing the three-side measurement described in the first embodiment, the user selects a "first mode" in the input unit 112. When executing the environment measurement described in the second embodiment, the user selects a "second mode" in the input unit 112.

Figure 13:
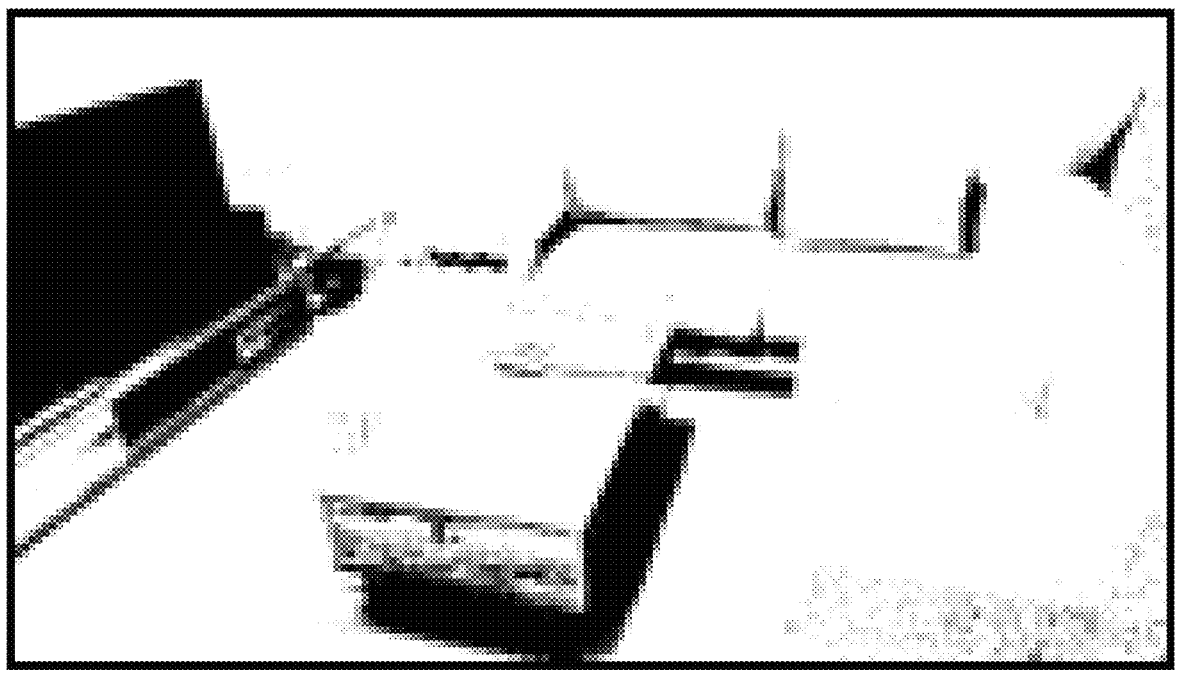
FIG. 13 is a screen view of a depth map according to a second embodiment.

FIG. 13 is a screen view of a depth map 210 according to the second embodiment.

After setting the mode to the second mode, the user directs the measurement device 100 toward the inside of the room and touches the measurement button. The laser irradiation unit 102 emits laser light, and the depth measurement unit 116 measures the distance depth of each point.

Figure 14:
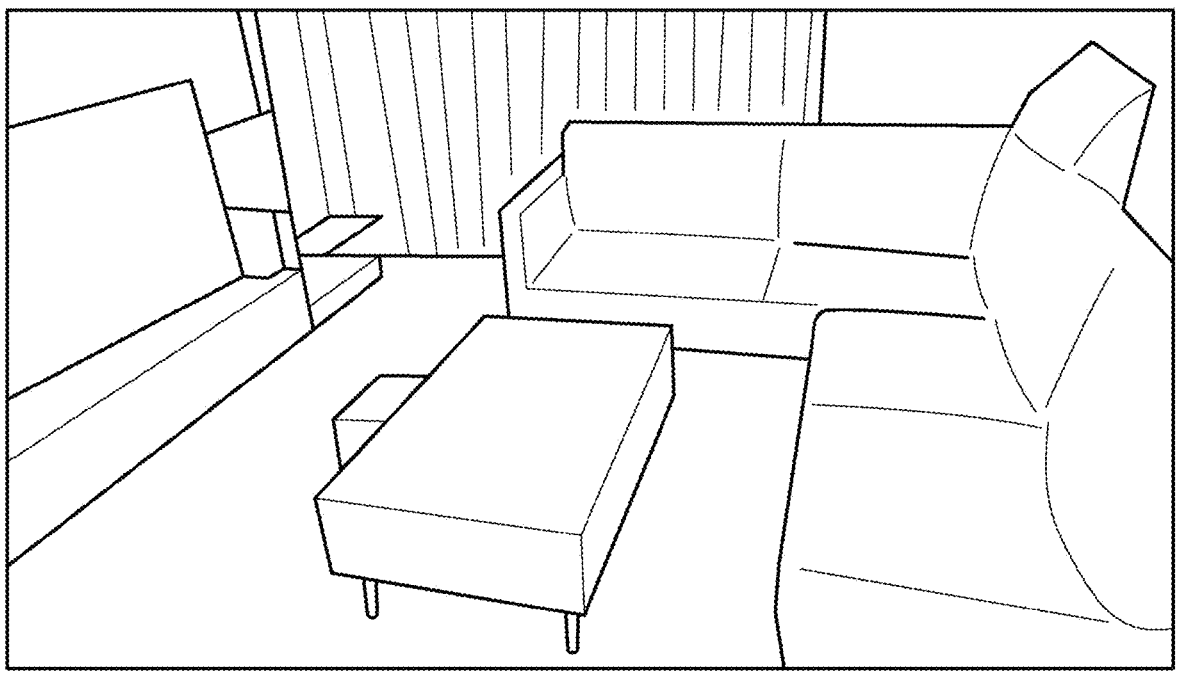
FIG. 14 is a screen view of a captured image according to the second embodiment.

FIG. 14 is a screen view of a captured image 220 according to the second embodiment.

Subsequently, the inside of the room is imaged by the camera 126. Similarly to the first embodiment, indoor imaging is continuously executed after completion of depth measurement by the LiDAR. The communication unit 108 transmits the depth map 210 and the captured image 220 to the server 300.

Figure 15:
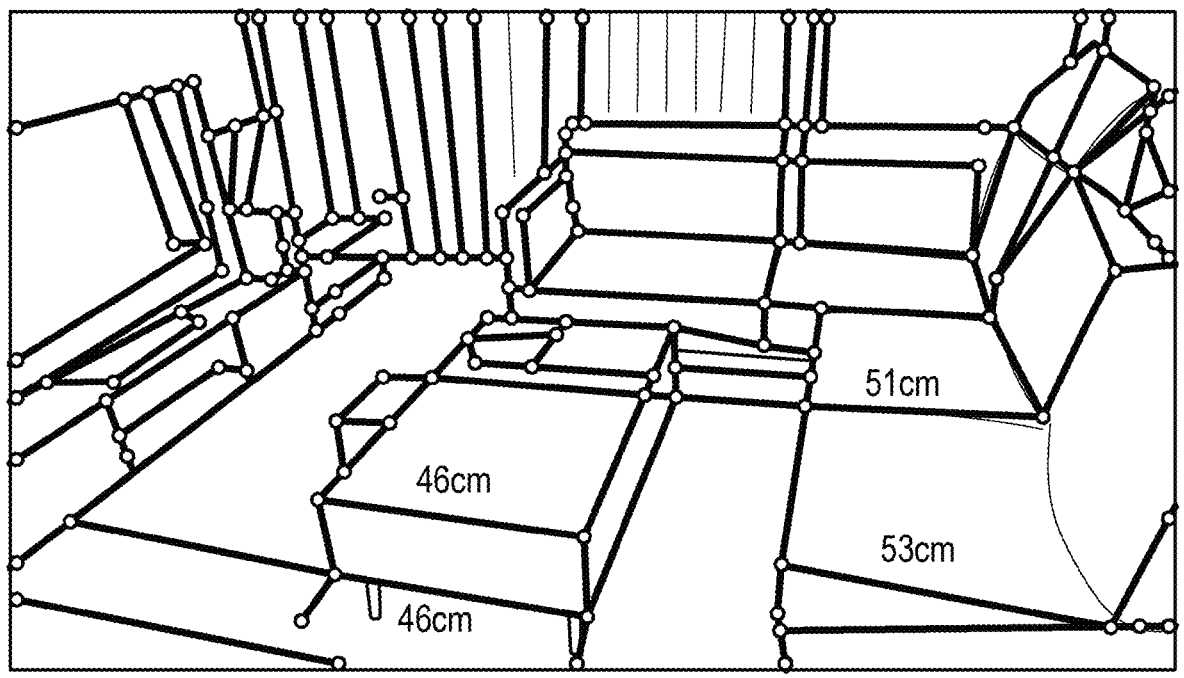
FIG. 15 is a screen view of a frame image according to the second embodiment.

FIG. 15 is a screen view of a frame image 230 according to the second embodiment.

First, the frame recognition unit 308 extracts original frames 152 from the captured image 220. The frame recognition unit 308 can extract the original frames 152 by regarding curves of some degree such as a seating surface of a sofa as straight lines. The captured image (first frame image) after the frame detection is transmitted from the server 300 to the measurement device 100.

The dimension estimation unit 118 executes the second-stage frame filtering on the first frame image. That is, the dimension estimation unit 118 combines a plurality of original frames 152 satisfying the proximity condition into one original frame 152. In the second embodiment (second mode), the dimension estimation unit 118 does not execute the frame filtering in the first stage, the third stage, and the fourth stage, and calculates the estimated frame length of the original frame 152 by the method described with reference to FIG. 11. The output unit 114 displays the estimated frame length for the plurality of original frames 152.

Conclusion

The measurement system 400 has been described above on the basis of the embodiments.

According to the first embodiment, the user can perform the three-side measurement of the package 200 with high accuracy simply by just holding the measurement device 100 over the package 200 and touching the measurement button. The user does not need to image the package 200 from directly above, and may image the package 200 from a direction in which the three sides of the package 200 are in the field of view. In recent years, the spread of the flea market application has increased opportunities for individuals to sell their personal items via the Internet. Since the user can easily perform the three-side measurement by imaging the personal item with the measurement device 100, size information necessary for selling the product can be easily registered on the website.

In the first embodiment, the original frames 152 not related to the three-side measurement can be efficiently removed by the four-stage frame filtering processing. In addition, by setting a plurality of measurement points for the candidate frame 174 and calculating the inter-point distance for the measurement points, it is possible to suppress the deviation between the measured frame length and the estimated frame length.

In the second embodiment, the user can easily measure the sizes of various objects in an external environment such as a living room. The camera 126 mounted on the measurement device 100 may be an omnidirectional camera. In addition, also in the second embodiment, unnecessary original frames 152 can be efficiently removed by the second-stage frame filtering.

In the second embodiment, if the user the environment measurement of the living room of their own home before going to a furniture store, the user can determine at the furniture store whether a piece of furniture that is a purchase candidate fits the living room of their home. Further, when the environment measurement is performed at a construction site, it is easy to consider a carry-in path of heavy machines and equipment at the construction site.

Note that the present invention is not limited to the above embodiments and modification examples thereof, and can be embodied by modifying the components without departing from the gist. Various inventions may be formed by appropriately combining a plurality of components disclosed in the above-described embodiments or the modification examples thereof. In addition, some components may be deleted from all the components described in the above-described embodiments and the modification examples thereof.

Modification Examples

In the present embodiment, it is assumed that the measurement device 100 performs depth measurement by LiDAR, and the LiDAR has been described assuming "dToF" (a system of measuring time by irradiating laser pulses) incorporated in iPhone (registered trademark). However, "iToF" (a system of emitting periodic laser light and indirectly calculating time from a phase shift of reflected light), which is another system of LiDAR, may be adopted. Further, the depth measurement may be performed by a known method other than LiDAR. For example, depth measurement may be performed by a laser distance meter, ultrasonic measurement, optical parallax (triangulation by stereo vision), or the like.

Although description has been given assuming that the measurement system 400 is constituted by the measurement device 100 and the server 300, part of the functions of the measurement device 100 may be realized by the server 300, or part of the functions of the server 300 may be assigned to the measurement device 100. In addition, a third device other than the measurement device 100 and the server 300 may perform part of the functions of the measurement device 100 or the server 300. A collection of the functions of the measurement device 100 and the functions of the server 300 described with reference to FIG. 2 can also be understood as one "information processing apparatus (measurement system)" in a broad sense. How to allocate a plurality of functions necessary for realizing the present invention to one or a plurality of pieces of hardware may be determined in view of processing capability of each piece of hardware, specifications required for the measurement system 400, and the like.

For example, all functions necessary for the measurement system 400 may be realized by the measurement device 100. In this case, the frame recognition unit 308 and the target object specification unit 310 of the server 300 may be realized as functions of the data processing unit 106 of the measurement device 100. That is, the data processing unit 106 of the measurement device 100 may include the frame recognition unit 308 and the target object specification unit 310 in addition to the depth measurement unit 116, the dimension estimation unit 118, and the classification unit 124.

As another example, the functions of the dimension estimation unit 118 and the classification unit 124 may be realized in the data processing unit 302 of the server 300 instead of the measurement device 100. In addition, when only the second mode is used, the target object specification unit 310 may be deleted from the measurement device 100 or the server 300.

The measurement device 100 or the server 300 may include a correction unit (not illustrated) that executes predetermined correction processing on the captured image. The correction unit may perform correction processing such as binarization, grayscale, and change of resolution of the captured image so that the frame recognition unit 308 can easily detect the original frames 152 from the captured image.

In the first embodiment, description has been given by assuming the case where the package 200 is imaged from obliquely above, but the user may image the package 200 from directly above. In this case, since the triple intersection is not detected, in the third-stage frame filtering, the dimension estimation unit 118 detects not the triple intersection but a double intersection connected to two original frames 152. When a plurality of double intersections is detected, the dimension estimation unit 118 may select a double intersection for which the total length of two candidate frames connected to the double intersection is larger.

For example, in a case where the package 200 illustrated in FIG. 9 is imaged from directly above, a total of eight double intersections including four double intersections corresponding to four vertices of the package 200 and four double intersections corresponding to four corners of the slip 156 are detected. The dimension estimation unit 118 selects double intersections where the total length of the two candidate frames connected to each of the double intersections is the longest.

When one of the four vertices of the package 200 is selected, the dimension estimation unit 118 can detect the longitudinal length and the lateral length of the package 200 by obtaining the frame lengths of two candidate frames connected to this double intersection. Furthermore, the height of the package 200 can also be obtained from the difference between the distance from the measurement device 100 to the floor surface 202 and the distance from the measurement device 100 to the upper surface of the package 200 (see Patent Literature 3). Therefore, even with a package 200 that is low in height, three-side measurement of the package 200 can be performed from directly above without squatting.

By causing the target object specification unit 310 to memorize an image of a cardboard box in advance by machine learning, the presence region 154 of the package 200 can be detected with high accuracy from the captured image 140. The target object specification unit 310 may memorize shapes of various objects such as a chair, a desk, a can, slippers, and a building in addition to the cardboard box. The user may select the measurement target object at the time of imaging. For example, when the user selects "slippers" as the measurement target object, the target object specification unit 310 specifies the presence region 154 of the slippers from the captured image. According to such a control method, the size of the slippers can be efficiently measured.

In the detection of the original frames 152 for the seat surface of a sofa or the like, the distance depth of the measurement points on the original frames 152 is particularly likely to vary. The dimension estimation unit 118 may exclude measurement points having abnormal three-dimensional coordinates in advance from a plurality of measurement points specified on the original frames 152 from the target of the inter-point distance calculation. For example, an average value and a variance value of the distance depth may be obtained for each of a plurality of measurement points measured on one original frame 152, and measurement points whose distance depth is one standard deviation or more away from the average value may be excluded as abnormal points from the calculation target of the inter-point distance.

In the second embodiment, it is not necessary to display the frame length for all the frames. The output unit 114 may display the frame lengths of a predetermined number of frames, for example, three frames with the longest frame lengths among the plurality of frames detected in the captured image. Alternatively, when the user touches the frame, the frame length of the touched frame may be displayed.

REFERENCE SIGNS LIST 100 measurement device
102 laser irradiation unit
104 user interface processing unit
106 data processing unit
108 communication unit
110 data storage unit
112 input unit
114 output unit
116 depth measurement unit
118 dimension estimation unit
124 classification unit
126 camera
130 depth map
140 captured image
150 first frame image
152 original frame
154 presence region
156 slip
158 carpet
160 second frame image
162 vertex
170 third frame image
172 triple intersection
174 candidate frame
176 division point
180 fourth frame image
190 fifth frame image
200 package
202 floor surface
210 depth map
220 captured image
230 frame image
300 server
302 data processing unit
304 communication unit
306 data storage unit
308 frame recognition unit
310 target object specification unit
400 measurement system

The invention claimed is:

1. A measurement system comprising:
a frame recognition unit configured to detect one or more frames indicating a straight line portion from a captured image;
a depth measurement unit configured to perform depth measurement; and
a dimension estimation unit configured to calculate a length of a frame on a basis of the captured image and a result of the depth measurement.

2. The measurement system according to claim 1, further comprising
a target object specification unit configured to specify a presence region of a measurement target object from the captured image,
wherein the dimension estimation unit calculates the length of the frame in the presence region.

3. The measurement system according to claim 1, wherein the dimension estimation unit detects a plurality of measurement points on the frame, calculates an inter-point distance that is a distance between two measurement points among the plurality of measurement points, and specifies, as the length of the frame, a maximum inter-point distance among a plurality of inter-point distances calculated for the plurality of measurement points included in the frame.

4. The measurement system according to claim 1, wherein, when a distance between one end point of a first frame and one end point of a second frame is smaller than a predetermined threshold and a distance between an other end point of the first frame and an other end point of the second frame is smaller than a predetermined threshold, the frame recognition unit further combines the first frame and the second frame into one frame.

5. The measurement system according to claim 1, wherein the dimension estimation unit specifies a triple intersection that is an end point shared by at least three frames, and calculates the length of each of the three frames having the triple intersection as an end point.

6. The measurement system according to claim 5, wherein, when a plurality of triple intersections is specified, the dimension estimation unit further specifies, as a longest triple intersection, a triple intersection for which a sum of lengths of the three frames having the triple intersection as an end point is largest, and calculates the length of each of the three frames having the longest triple intersection as an end point.

* * * * *